United States Patent [19]

Gold

[11] Patent Number: 5,150,943
[45] Date of Patent: Sep. 29, 1992

[54] VEHICLE WINDOW AND METHOD OF INSTALLING SAME

[76] Inventor: Peter Gold, 389 Peninsula Blvd., Hempstead, N.Y. 11550

[21] Appl. No.: 835,529

[22] Filed: Feb. 14, 1992

[51] Int. Cl.⁵ .......................... B62D 27/02; B60J 1/10
[52] U.S. Cl. ..................................... 296/201; 52/208; 52/400
[58] Field of Search .................... 296/201, 93; 49/488; 52/208, 400

[56] References Cited

U.S. PATENT DOCUMENTS

| | | | |
|---|---|---|---|
| 3,897,666 | 8/1975 | McClure | 52/400 |
| 4,405,175 | 9/1983 | Hoffmann | 296/201 |
| 4,697,841 | 10/1987 | Klein et al. | 296/201 |
| 4,989,383 | 2/1991 | Frank | 52/400 |
| 5,096,255 | 3/1992 | Leischner | 296/201 |

Primary Examiner—Robert R. Song

[57] ABSTRACT

A porthole van window to increase available daylight in which the window is initially adhesively attached to a first molding seated in the circular window opening and has a second molding attached to its peripheral edge, beneath which a curable sealant is deposited for firmly bonding the window to the side panel of the van.

3 Claims, 1 Drawing Sheet

VEHICLE WINDOW AND METHOD OF INSTALLING SAME

The present invention generally relates to improvements for porthole windows provided as "daylight" openings in one or both rear sides of a van, wherein more particularly, the improvements result not only in a better construction of the window, but also greatly facilitate its installation.

EXAMPLE OF THE PRIOR ART

In U.S. Pat. No. 4,405,175 issued to Elman Hoffmann on Sept. 20, 1983, a molding is provided having an inwardly facing U-shape and an outwardly facing U-shape and, in use, the outwardly facing U-shape is seated over the edge bounding a window opening while the inwardly facing U-shape receives in projected relation therein the peripheral edge of the window. It has been found in practice that an external force exerted against the installed window too easily either dislodges the window from the molding or unseats the molding from the window opening edge.

Broadly, it is an object of the present invention to provide a round, porthole-type window of the type commonly used for a van-type vehicle overcoming the foregoing and other shortcomings of the prior art. More particularly, it is an object to provide a van porthole window that is firmly adhesively secured in place and is installed in a greatly facilitated manner by the user who may want to modify the van as purchased by adding the porthole window as a desirable "daylight" opening. The installation according to the present invention was also found to significantly add to the structural stability of the panel receiving the window.

The description of the invention which follows, together with the accompanying drawings should not be construed as limiting the invention to the example shown and described, because those skilled in the art to which this invention appertains will be able to devise other forms thereof within the ambit of the appended claims.

Figure 1:
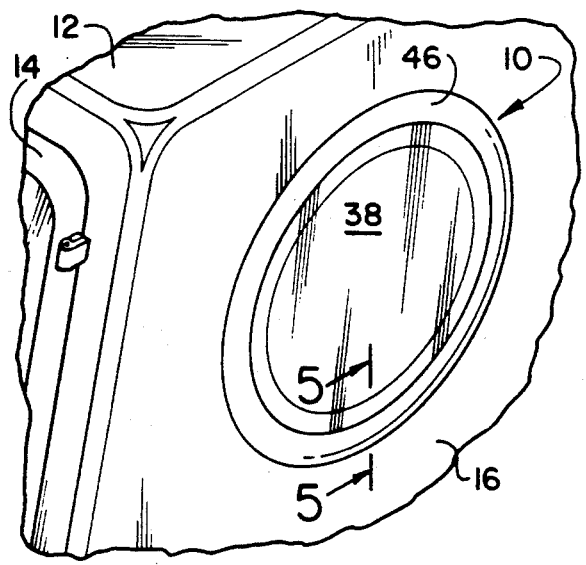
FIG. 1 is a partial perspective view of a vehicle known in the trade as a van having the within inventive window installed according to the method of the present invention.
Figure 5:
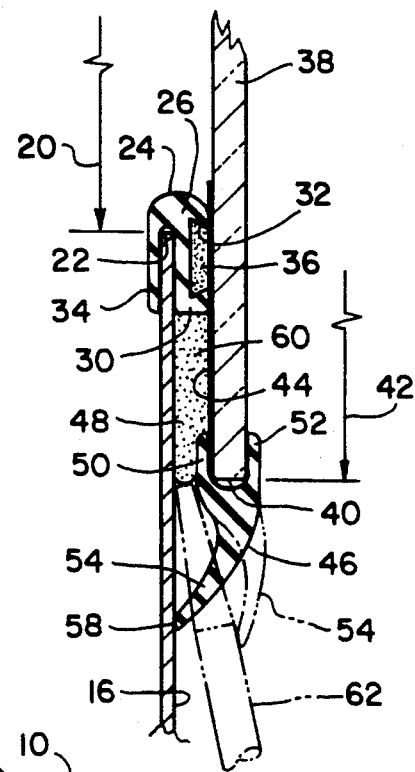
Figure 2:
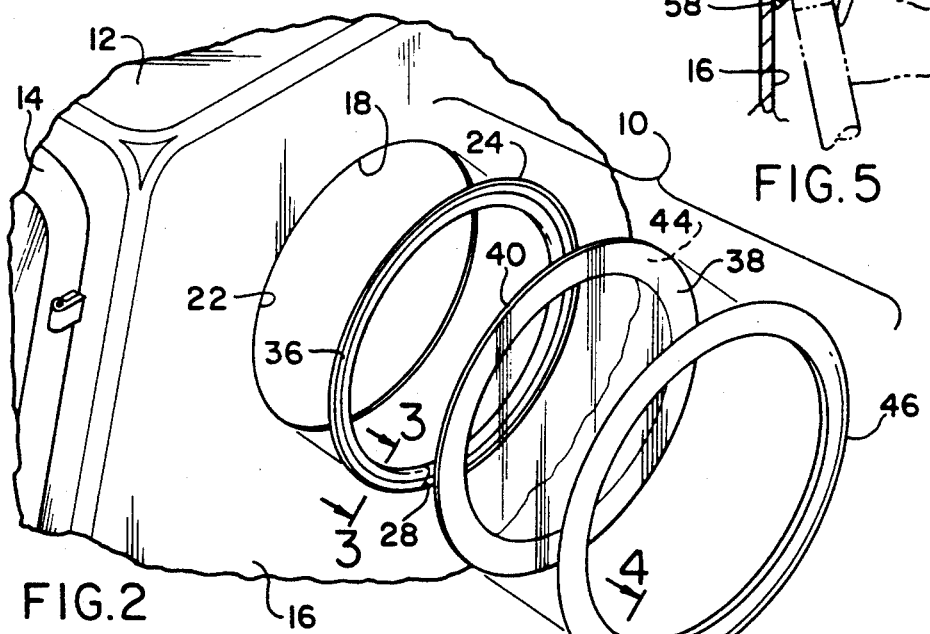
FIG. 2 is a view similar to FIG. 1 showing the window components in unassembled relation.
Figure 3:
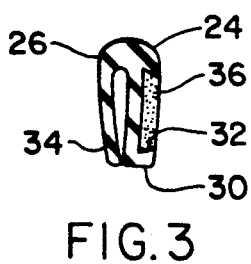
Figure 4:
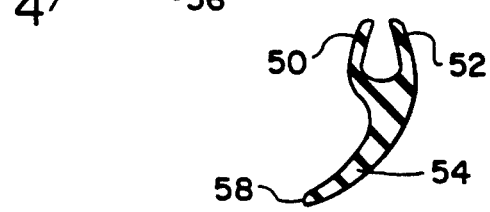

FIG. 3 and FIG. 4 are cross sectional views respectively taken along lines 3—3 and 4—4 of FIG. 2; and FIG. 5 is a cross sectional view taken along line 5—5 of FIG. 1.

In FIG. 1 a circular window is shown mounted on the side panel of a van type vehicle 12. Typically vans of this type have rear opening doors 14 and uninterrupted left and right side panels 16. Depending on the commercial end use or application of the vehicle 12, it is frequently required to add side windows to panels 16. In the past, it was necessary to cut very accurate openings in panels 16 to fit expensive metal framed windows designed for add-on installation. Prior windows often resulted in weakened side panels 16, and also required the use of gaskets and repeated applications of caulking to prevent water leaks.

The window of the present invention, generally designated 10, is a more simpler, economically installed unit, while maintaining the watertight and structural integrity of panels 16.

Window 10 is comprised of the components illustrated in unassembled relation in FIGS. 2, 3 and 4, and in assembled relation in FIG. 5.

According to a selected size specification, an opening 18 is located and cut in panel 16 which, in a typical case, has a nominal diameter 20 called in the trade the "daylight" opening. Edge 22 of this opening is smoothed to minimize burrs and sharp edges that might cut or chaff the subsequently installed mounting 24. Mounting 24, made of flexible elastomeric material, has a U-shaped cross section 26 and is sized to straddle the peripheral edge 22 of opening 18. Mounting 24 may be prepared as a circular molded piece previously cut to size, or made up on site of a length of extruded molding having a cemented butt joint 28 of the opposite ends thereof. The outboard leg 30 is extruded with, or otherwise appropriately provided with a dove tail shaped groove 32 in its outwardly facing surface. Both leg 30 and inboard leg 34 are extruded with a bias towards each other, and thus with a better shape to promote a secure fit about edge 22. A butyl tape 36, preferably of the well known commercially available type known to have a bonding strength of 35 pounds per square inch, is preassembled by insertion into groove 32. After molding 24 is in place about edge 22, the protective paper covering (not shown) is removed from tape 36 incident to the adherence thereto of a glass window 38. Alternately, if groove 32 is not prepared with tape 36, suitable butyl caulking is applied within groove 32 after mounting 24 is in place within opening 18 and achieves the same function. Window 38 is prepared with a finished peripheral edge 40 and is specified in size to have a diameter 42 equal to diameter 20 of opening 18 plus three inches. On the inside surface of glass 38 for typically an inch and three quarters, an opaque paint 44 is applied thereon primarily to act as an ultra-violet shield to protect mounting and sealing elements 24, 36 and 48, now to be described. Element 46, like mounting 24, is made of a flexible elastomeric construction material and has a y-shaped cross section, as best seen in FIGS. 4 and 5. Inner and outer legs 50, 52 are biased toward each other, as is extension leg 54 biased in an inward direction. Element 46 can be manufactured either as a molded ring or extruded strip. When made as an extrusion, element 46 is formed into a ring or circular shape having a cemented butt joint 56. Seal element 46 is applied about peripheral edge 40 prior to pressing the glass window 38 concentrically against the butyl adhesive 36 already in place on mounting 24. When circular glass window 38 is in place, with seal or molding 46 thereon, the molding extension leg 54 advantageously forms a weather seal in the contact of its edge 58 against panel 16.

A peripheral cavity 60 or compartment circumferentially about window 10, is defined by panel 16, the bottom edge of leg 30 on mounting 24, window glass 38 with its painted underside margin 44, and inner leg 52 of seal 46. The method of the present invention now contemplates that compartment 60 beneath the molding leg 54, which readily lifts for this purpose, be filled with urethane adhesive 48, preferably of the commercially available type known to have a bonding strength of 900 lbs per square inch. As shown in phantom perspective in FIG. 5, access to compartment 60 is readily made by inserting a caulking gun tip 62 under extension leg 54, which flexes outwardly and over said tip. Peripheral compartment or zone 60 is thus filed by advancing tip 62 in a circular path about the window 10 while applying pressure releasing the urethane adhesive 48 from the caulking gun 62. Adhesive 48 is then allowed to cure which completes a permanent bonding attachment of the window 10 to the van panel 16.

Not only is window 10 installed in a facilitated manner as just described, but the hardening of the adhesive 48 in its circular location about the window has been found in practice to significantly add to the structural strength or stability of the panel 16.

While the components for constructing the within inventive window, as well as the method of its installation herein shown and disclosed in detail are fully capable of attaining the objects and providing the advantages hereinbefore stated, it is to be understood that they are merely illustrative of the presently preferred embodiment of the invention and that no limitations are intended to the detail of window construction or design or installation herein shown other than as defined in the appended claims.

What is claimed is:

1. A wall-supported circular window for a van-type vehicle of the type having a wall and a circular-shaped window opening in said wall bounded by a peripheral edge, a mounting for said window comprising a U-shaped length in cross section of elastomeric construction material disposed in covering relation over said window opening peripheral edge along the entire circular shape thereof presenting inwardly and outwardly facing surfaces, a groove in said outwardly facing surface, an adhesive strip disposed in said groove, a circular window having a peripheral edge defining said circular shape adhesively secured to said adhesive strip at a location inwardly of said peripheral edge so that the peripheral edge extending beyond said location of adhesive attachment bounds a compartment between said window peripheral edge and an underlying area of said vehicle wall, an elastomeric flexible lip connected to extend radially of said window peripheral edge, and solidifying adhesive deposited beneath said lip in said compartment, whereby said window is connected by said adhesive to said vehicle wall and the solidification thereof contributes to the rigidity of the vehicle wall area circumferentially about said window.

2. A method of mounting a circular window with a peripheral shape-defining edge on a support wall of a van-type vehicle in covering relation over a circular opening in said wall, said method comprising the steps of disposing a U-shaped length of elastomeric construction material in covering relation over said wall edge bounding said circular opening therein, attaching an adhesive strip on an exterior surface of said elastomeric strip, attaching a circular-shaped window to said adhesive strip sized to extend radially beyond said adhesive strip so as to form a compartment between said radially extending window peripheral edge and an underlying area of said vehicle wall, attaching an elastomeric flexible lip to extend radially of said window peripheral edge, and depositing a solidifying adhesive beneath said flexible lip in said compartment, whereby the solidification of said adhesive bonds said window to said vehicle wall and contributes to the rigidity of the vehicle wall are circumferentially about said window.

3. A method of mounting a van circular window as claimed in claim 2 including applying on the underside peripheral edge of the window an opaque paint to mask the presence of the adhesive behind said peripheral edge.

* * * * *